(12) United States Patent
Kim et al.

(10) Patent No.: US 7,511,081 B2
(45) Date of Patent: Mar. 31, 2009

(54) RECYCLED METHOD FOR A WASTED POLYMER WHICH IS MIXED POLYESTER POLYAMIDE AND RECLAIMED MATERIALS THEREOF

(76) Inventors: Do-Gyun Kim, 104-603, Mabuk-Ri Yeonwonmaeul, Hyundai Apt, Guseong-Eup Youngin-Si, Gyeonggi-Do 449-937 (KR); Hyo-Sung Kim, 104-603, Mabuk-Ri Yeonwonmaeul, Hyundai Apt, Guseong-Eup Youngin-Si, Gyeonggi-Do 449-937 (KR)

( * ) Notice: Subject to any disclaimer, the term of this patent is extended or adjusted under 35 U.S.C. 154(b) by 183 days.

(21) Appl. No.: 10/599,339

(22) PCT Filed: Mar. 24, 2005

(86) PCT No.: PCT/KR2005/000851

§ 371 (c)(1),
(2), (4) Date: Sep. 26, 2006

(87) PCT Pub. No.: WO2005/092963

PCT Pub. Date: Oct. 6, 2005

(65) Prior Publication Data

US 2008/0194713 A1      Aug. 14, 2008

(30) Foreign Application Priority Data

Mar. 26, 2004   (KR) ................. 10-2004-0020944
Apr. 6, 2004    (KR) ................. 10-2004-0023579

(51) Int. Cl.
 *C08J 11/04*   (2006.01)
(52) U.S. Cl. ............ 521/49.5; 521/40; 521/48; 521/48.5; 525/425; 528/480; 528/176; 528/184; 528/192; 528/194; 528/208; 528/209; 528/271; 528/272; 528/288; 528/292; 264/37.1; 560/19; 560/76; 560/79
(58) Field of Classification Search ........... 521/48.5, 521/40, 48, 49.5; 525/425; 264/36.1, 37.1; 528/480, 176, 184, 192, 194, 208, 209, 271, 528/288, 191; 560/78, 76, 19
See application file for complete search history.

(56) References Cited

U.S. PATENT DOCUMENTS

| | | | | |
|---|---|---|---|---|
| 4,110,266 A | * | 8/1978 | Sheratte | ............ 521/49 |
| 4,609,680 A | * | 9/1986 | Fujita et al. | ........... 521/48 |
| 5,216,149 A | | 6/1993 | Evans et al. | |
| 5,258,230 A | * | 11/1993 | LaFleur et al. | ........... 428/412 |
| 5,346,967 A | * | 9/1994 | Clagett et al. | ........... 525/425 |
| 5,378,769 A | * | 1/1995 | Mugge et al. | ........... 525/425 |
| 5,446,109 A | * | 8/1995 | Matsumura et al. | ........ 525/420 |
| 5,532,404 A | | 7/1996 | Gallagher | |
| 5,703,177 A | * | 12/1997 | Hoff | ........... 525/411 |
| 5,776,989 A | * | 7/1998 | Kubota et al. | ............ 521/48 |
| 6,417,239 B1 | * | 7/2002 | Murray et al. | ............ 521/48.5 |
| 7,166,690 B2 | * | 1/2007 | Kim | ........... 528/480 |
| 2004/0059011 A1 | * | 3/2004 | Barber et al. | ............ 521/99 |
| 2006/0122337 A1 | * | 6/2006 | Sato et al. | ............ 525/419 |
| 2007/0093616 A1 | * | 4/2007 | Strauch et al. | ........... 525/425 |

FOREIGN PATENT DOCUMENTS

JP   07-316280   12/1995
JP   2001-058366   3/2001

* cited by examiner

*Primary Examiner*—James Seidleck
*Assistant Examiner*—Frances Tischler
(74) *Attorney, Agent, or Firm*—IPLA P.A.; James E. Bame

(57) ABSTRACT

The present invention relates to a recycling method of a mixed waste of polyester and polyamide (hereinafter, referred to as "mixed waste") in which polyesters including polyethylene terephthalate and polyamides are inseparable from one another. In accordance with the recycling method of the present invention, it is possible to prepare a solid block polymer having an acid value of 1 to 150 mgKOH/g, a weight average molecular weight of 3,000 to 50,000 and a softening point of 10 to 150° C., or a liquid polyester-amide block polymer composition having good compatibility, solubility and dispersibility. In addition, the polymer having an acid value of more than 20 mgKOH/g is reacted with a basic compound to form a neutralized salt which is then used to prepare a water-soluble polyester-amide block polymer composition. The prepared water-soluble polyester-amide block polymer composition can be utilized as industrially useful material such as synthetic resin fine particles, microcapsules, adsorbents, polymerization toner binders for electron photography, fiber processing agents, sizing agents for use in papermaking and paper strength agents, wastewater treatment agents, dispersants, cement admixtures, inkjet ink binders, epoxy resin curing agents and modifiers, water-dispersible epoxy resin curing agents and modifiers. The solid or liquid polyester-amide block polymer composition having an acid value of less than 10 mgKOH/g can be employed as industrially useful material such as printer ink, coating materials, powder paints, adhesives, hot melt adhesives, binders for toner manufactured by grinding methods, waterproofing agents, unsaturated polyester-amide resins, and polyurethane resins.

26 Claims, No Drawings

RECYCLED METHOD FOR A WASTED POLYMER WHICH IS MIXED POLYESTER POLYAMIDE AND RECLAIMED MATERIALS THEREOF

TECHNICAL FIELD

The present invention relates to a process for preparing a polyester-amide resin composition capable of being used as a new material, and having polyester blocks and polyamide blocks in a molecular structure of a polymer produced by recycling a mixed waste of polyester and polyamide (hereinafter, referred to as "mixed waste") such as polyester and polyamide mixed-fiber waste, waste plastic bottles and waste composite molded articles, in which polyesters including polyethylene terephthalate and polyamides are mixed and thus are inseparable from one another

BACKGROUND ART

Recently, as polyesters and polyamides, typically represented by PET and nylon, have been widely used in manufacturing fibers, PET bottles, films and injection molded articles as plastic materials, a great amount of waste materials produced in a manufacturing process thereof and after use thereof raise environmental concerns. However, recycling amount and rate of such waste materials are very small and limitative. Currently, such waste materials are at most subjected to simple physical heat-melting treatment to produce secondary processed products or materials. Therefore, the resulting reclaimed products exhibit poor qualities, thus resulting in marked limitation of recyclability thereof. Furthermore, advanced industrial countries including the USA and Japan have effected strict environmental regulations, as a result, and to cope with such actions and trends, some companies have proposed products and methods of producing the same via recycling methods using chemical reaction. For example, reference may be made to U.S. Pat. Nos. 4,166,896, 4,223,068 and 4,417,001, and Japanese Patent Publication Laid-open Nos. Hei 5-311114, 6-9923 and 8-253596, all of which relate to a method of recycling a waste material containing polyester (PET) only. In particular, polyester/polyamide mixed products such as plastic bottles, composite molded articles and blended fibers are not recycled at all at present, raising major problems associated with disposal thereof, thus leading to an urgent need for solution to these problems. Further, no research into obtaining and manufacturing high functional materials has been conducted hitherto.

DISCLOSURE OF INVENTION

Technical Problem

As a result of extensive and intensive research and study on recycling of waste material in which polyester and polyamide are mixed, as opposed to pure polyester (PET), in order to solve the above problems exhibited by conventional arts, the present inventors have found that, upon subjecting the mixed waste to physical grinding, depolymerization and polycondensation, it is possible to obtain a solid or liquid polymer containing polyester blocks and polyamide blocks in the molecular structure of the resulting polymer and having desired physical properties, thereby creating high performance and high value-added industrially useful materials, and present the present invention based on these findings. Therefore, it is an object of the present invention is to provide a process for preparing a polyester-polyamide block polymer composition.

Technical Solution

In order to solve the above-mentioned technical problems, the present invention is disclosed in the following embodiments: (1) depolymerization embodiment utilizing solid resins, (2) depolymerization embodiment utilizing polyhydric alcohols, (3) depolymerization embodiment utilizing polyhydric alcohols in conjunction with solid resins, (4) depolymerization embodiment utilizing oligomers, and (5) depolymerization embodiment utilizing monoglycerides of fatty acids and mono polyhydric alcoholides of fatty acids.

In accordance with a first embodiment of the present invention, the above and other objects can be accomplished by the provision of a recycling method of a mixed waste, comprising:

(a) depolymerizing the mixed waste using a solid resin and subjecting the depolymerized mixed waste to addition reaction by adding a polybasic acid;

(b) polycondensing the depolymerized product with a polyhydric alcohol to obtain a polyester-amide block polymer having an acid value of 1 to 150 mg KOH/g; and (c) recovering the polyester-amide block polymer in a solid or solution state where the acid value is greater than 20 mgKOH/g, or recovering the polyester-amide block polymer in a solid state where the acid value is less than 20 mgKOH/g.

In accordance with a second embodiment of the present invention, there is provided a recycling method of a mixed waste, comprising:

(a) reacting the mixed waste with a polyhydric alcohol to obtain a polyester-amide depolymerization product;

(b) reacting the depolymerized product with a polybasic acid, and polycondensing the reaction product with the polyhydric alcohol to obtain a polyester-amide block polymer containing 2 or 3 carboxyl groups at chain ends thereof and having an acid value of 1 to 150 mgKOH/g; and (c) reacting the polyester-amide block polymer with a basic compound to obtain a polyester-amide block polymer in the form of a neutralized salt, followed by dispersing in water, a hydrophilic solvent or a mixed solvent thereof to obtain a water-soluble and water-dispersible polyester solution.

In accordance with a third embodiment of the present invention, there is provided a recycling method of a mixed waste, comprising:

(a) reacting the mixed waste with a polyhydric alcohol to obtain a polyester-amide depolymerization product, followed by stabilizing with a depolymerization-stabilizing solid resin to obtain a stabilized polyester-amide depolymerization product;

(b) polycondensing the depolymerized product with a polybasic acid, dimethyl 5-sodium sulfoisophthalate (DMSSIP) or a mixture thereof, and adding an acid value-adjusting polyhydric alcohol to the resulting reaction product to obtain a polyesteramide block polymer; and (c) recovering the polyester-amide block polymer in the form of an aqueous solution where the polymer is dissolved in water, in the form of an organic solution where the polymer is dissolved in a hydrophilic organic solvent, or in solid form.

In accordance with a fourth embodiment of the present invention, there is provided a process for recycling a mixed waste, comprising:

(a) reacting a polyhydric alcohol with an alkali metal sulfonate of aromatic dicarboxylic acid including DMSSIP to prepare a polyester oligomer;

(b) reacting the polyester oligomer with the mixed waste to depolymerize the mixed waste, followed by polycondensation following transesterification to obtain a polyester-amide block polymer; and (c) recovering the polyester-amide polymer in the form of an aqueous solution where the polymer is dissolved in water, in the form of an organic solution where the polymer is dissolved in a hydrophilic solvent, or in solid form.

In accordance with a fifth embodiment of the present invention, there is provided a process for recycling a mixed waste, comprising:

(a) transesterifying oil and fat with a polyhydric alcohol including glycerin to prepare a monoglyceride of a fatty acid and a monoalcoholide of a fatty acid and adding a mixed waste thereto, thereby depolymerizing the mixed waste;

(b) adding a polybasic acid and a polyhydric alcohol to the depolymerization composition to prepare an oil-modified alkyd resin containing a polyester-amide block polymer as the polycondensation product;

(c) dissolving the oil-modified alkyd resin containing a polyester-amide polymer in an organic solvent such as naphtha or xylene and recovering the resulting organic solution of the alkyd resin.

In step (b) of the above-mentioned five embodiments of the present invention, a monomer or waste polyamide producing polyamide may be additionally added and reacted to produce a polyamide block. Preferably, the monomer or waste polyamide are added in content of 1 to 90% by weight to the prepared polymer.

In accordance with the recycling method of the mixed waste of the present invention, it is possible to readily obtain a liquid or solid polyester-amide block polymer having good compatibility, solubility and dispersibility by recycling the mixed waste. Specifically, the polyester-amide resin obtained according to the recycling method of the present invention exhibits superior compatibility, dispersibility, solubility and adhesiveness.

Therefore, the polyester-amide block polymer recycled according to the present invention can be used as an industrially useful material such as synthetic resin fine particles, microcapsules, adsorbents, polymerization toner binders for electron photography, fiber processing agents, sizing agents for paper-making and paper strength agents, wastewater treatment agents, cement admixtures, inkjet ink binders, epoxy resin curing agents and modifiers, water-dispersible epoxy resin curing agents and modifiers, printer ink, paints, powder paints, adhesives, hot melt adhesives, binders for toners manufactured by grinding methods, waterproof agents, crosslinking curable unsaturated polyester-amide resins, and polyurethane resins.

BEST MODE FOR CARRYING OUT THE INVENTION

Hereinafter, a recycling method of a mixed waste in accordance with respective embodiments of the present invention will be specifically described.

Firstly, the recycling method of the mixed waste in accordance with a first embodiment of the present invention is illustrated.

The recycling method of the mixed waste in accordance with a first embodiment of the present invention comprises:

(a) Depolymerizing the mixed waste;

(b) Polycondensing the resulting depolymerized product with a polyhydric alcohol to obtain a polyester-amide block polymer having an acid value of 1 to 150 mgKOH/g; and (c) Recovering the polyester-amide block polymer in a solid or solution state where the acid value is greater than 20 mgKOH/g, or recovering the polyester-amide block polymer in a solid state where the acid value is less than 20 mgKOH/g.

Step (a) is a step of depolymerizing the collected mixed waste. That is, the mixed waste is physically ground, melted under an inert gas atmosphere such as nitrogen, and reacted with a solid resin dissolving agent, thereby performing first depolymerization. Components, abietic acid, pimaric acid or composite resin acid, having reactive functional groups such as conjugated bonds in the molecular structure of the solid resin dissolving agent react with ester bonds and amide bonds in the mixed waste to cleave the backbone chain, resulting in depolymerization of the mixed waste thus leading to lowered molecular weight. Specific examples of the solid resin dissolving agent that can be used in the present invention include, but are not limited to, gum rosin, wood rosin, tall rosin, hydrogenated rosin, maleated rosin, rosin ester, pinene resin, dipentene resin, C5 petroleum resin, C9 petroleum resin, dammar resin, copal resin, DCPD resin, hydrogenated DCPD resin, maleated styrene resin and any combination thereof.

Preferably, a mixing ratio of the solid resin dissolving agent: mixed waste is in the range of 1:10 to 10:1, on the basis of weight ratio. A mixing ratio of less than 1:10 may result in inferior depolymerization of the mixed waste. In contrast, where the mixing ratio is greater than 10:1, this may cause problems such as inferior heat resistance and mechanical properties.

Next, in order to control intrinsic viscosity and molecular weight, the depolymerization product is reacted with a polybasic acid to further progress second depolymerization and addition reaction (Diels-Alder Reaction). Specific examples of the polybasic acid that can be used in the present invention include, but are not limited to, anhydrous phthalic acid, isophthalic acid, terephthalic acid, adipic acid, azelaic acid, sebacic acid, anhydrous tetrahydrophthalic acid, anhydrous maleic acid, fumaric acid, itaconic acid, trimellitic acid, anhydrous trimellitic acid, anhydrous pyromellitic acid, succinic acid, cyclohexane dicarboxylic acid, naphthalene dicarboxylic acid, dimeric acid, C6-C25 fatty acid and any combination thereof.

Preferably, the polybasic acid is used in an amount of 1 to 70% by weight, based on the weight of the first depolymerization product. If the amount of the polybasic acid is less than 1% by weight, this may lead to production of high melting point polymer, thereby presenting poor modification problems. Whereas, if the amount of the polybasic acid exceeds 70% by weight, this may lead to consumption of a great deal of polyhydric alcohol which is thus disadvantageous from an economic point of view.

Step (b) consists of polycondensing the depolymerized product of step (a) with the polyhydric alcohol to control an acid value and to increase molecular weight.

Specific examples of the polyhydric alcohol that can be used in the present invention include, but are not limited to, ethylene glycol, propylene glycol, 1,3-propanediol, 1,4-butanediol, 1,6-hexanediol, neopentyl glycol, diethylene glycol, dipropylene glycol, polyethylene glycol, alkylene oxide adduct of bisphenol A, trimethylol propane, glycerin, pentaerythritol, monoglycerides of fatty acids and mono polyhydric alcoholides of fatty acids, and any combination thereof.

Preferably, the amount of the polyhydric alcohol to be used is in the range of 1 to 70% by weight, based on the weight of the product depolymerized in step (a). Where the amount of the polyhydric alcohol is less than 1% by weight, this may cause poor modification due to production of a high melting point polymer. In contrast, where the amount of the polyhydric alcohol is greater than 70% by weight, this may lead to production of a high molecular weight polymer, thus presenting problems associated with poor water-solubility or poor water-dispersibility. In addition, in order to control physical properties of the product, additional monomer and waste polyamide producing a polyamide may be added and reacted to produce polyamide blocks. Preferably, the monomer and waste polyamide is added in the content of 1 to 90% by weight relative to the prepared polymer.

Polyamide-producing monomer or waste polyamide that can be used in step (b) are at least one of waste materials selected from the group consisting of lactams containing more than 6 carbon atoms such as epsilon-caprolactam and lauryl lactam; aliphatic amino carboxylic acids such as amino caproic acid, 7-aminoheptanoic acid, 11-aminoundecanoic acid, 12-aminododecanoic acid; polycondensation products of diacid and diamine such as hexamethylenediamine diadipale; and waste polyamides such as 6-nylon, 6,6-nylon, 11-nylon, and 12-nylon.

From water-solubility and water-dispersibility points of view, the acid value of the polyester-amide thus obtained is preferably adjusted to the range of 1 to 150 mgKOH/g. If the acid value is less than 1 mgKOH/g, this may lead to problems such as poor water-solubility and water-dispersibility. Whereas, if the acid value is greater than 150 mgKOH/g, this may lead to problems associated with adhesiveness, chemical properties and electrical properties.

Reactions in steps (a) and (b) are all progressed at solid phase of melt state. It is preferred to progress the reactions in the presence of a reaction catalyst, for example 0.05 to 0.5% by weight of dibutyltin oxide (DBTO), based on the total weight of reactants, from the stand point of acceleration of reaction rate. In addition, steps (a) and (b) are preferably carried out in the range of 200 to 250° C. Where the reaction temperature is below 200° C., this may present problems such as delayed reaction rate and production of low molecular weight polymers. In contrast, where the reaction temperature is above 250° C., this may present problems such as oxidative reactions and production of high molecular weight polymers.

For preferred adhesiveness and mechanical properties, the polyester-amide polymer obtained in step (b) has a weight average molecular weight of 3,000 to 50,000 and a softening point of 10 to 150° C., and polyamide blocks are controlled to be contained in the amount of 1 to 90% by weight in the molecular structure of the resulting polymer.

When the acid value of the thus-obtained polyester-amide block polymer is greater than 20 mgKOH/g, it is possible to not only recover the polyester-amide block polymer in solid form, but also to recover it in the form of a solution where the polymer is dissolved in water, a hydrophilic solvent or a mixed solvent thereof, due to water-solubility suited for desired use and application. In contrast, when the acid value of the polyester-amide polymer is less than 20 mgKOH/g, it is not possible to recover the polyester-amide block polymer in the form of an aqueous solution due to difficulty to obtain sufficient solubility, and thus it is preferred to recover the polymer in solid form for use as a solid state or after dissolving in a suitable solvent, depending upon desired use.

Where it is desired to recover the polyester-amide block polymer in the form of a solution in step (c), the solution is preferably prepared according to the following steps.

That is, the polyester-amide block polymer obtained in step (b), having an acid value of more than 20 mgKOH/g, is reacted with a basic compound to obtain a neutralized salt of the polyester-amide block polymer. During a neutralization process, carboxyl groups present in the polyester-amide polymer are converted into their corresponding neutralized salt structures, thereby increasing water-solubility. Specific examples of the basic compound that can be used in the present invention include, but are not limited to, sodium hydroxide, potassium hydroxide, ammonium hydroxide, lithium hydroxide, organic amines and any combination thereof. The amount of the basic compound to be used is preferably in the range of 3 to 30% by weight, based on the weight of the polyester-amide polymer. If the amount of the basic compound is less than 3% by weight, this may raise problems such as poor water-solubility or poor water-dispersibility. In contrast, if the amount of the basic compound is greater than 30% by weight, this may lead to problems associated with adhesiveness, chemical properties, and electrical properties.

When the neutralized polyester-amide block polymer is dissolved in water, a hydrophilic solvent or a mixture thereof, an aqueous polyester solution or a polyester organic solution can be obtained. Specific examples of the hydrophilic solvent that can be used in the present invention include, but are not limited to, alcohols, ethers, acetone, diacetone alcohol, dimethyl formamide and dimethyl acetamide, tetrahydrofuran, ethyl cellosolve, propyl cellosolve, butyl cellosolve, N-methyl-2-pyrollidone and any combination thereof.

Preferably, water, the hydrophilic solvent, or a mixed solvent thereof is used in 1 to 10-times the amount of the weight of the neutralized polyester-amide polymer. If the amount of the solvent to be used is less than 1 times the amount of the weight of the neutralized polyester-amide polymer, this may result in poor workability. In contrast, if the amount of the solvent is greater than 10 times the amount of the weight of the neutralized polyester-amide block polymer, the resulting solution is excessively diluted, thus presenting problems associated with adhesiveness and efficiency.

Hereinafter, the recycling method of the mixed waste in accordance with the second embodiment of the present invention will be illustrated.

Firstly, the mixed waste is depolymerized by reacting with a polyhydric alcohol. Hydroxyl groups of the polyhydric alcohol react with ester bonds in the mixed waste to cleave the backbone chain, thereby depolymerizing the mixed waste leading to decreased molecular weight thereof. Specific examples of the polyhydric alcohol that can be used in the second embodiment of the present invention include, but are not limited to, ethylene glycol, propylene glycol, 1,3-propanediol, 1,4-butanediol, 1,6-hexanediol, neopentyl glycol, diethylene glycol, dipropylene glycol, polyethylene glycol, alkylene oxide adduct of bisphenol A, trimethylol propane, glycerin, pentaerythritol, monoglycerides of fatty acids and mono polyhydric alcoholides of fatty acids, and any combination thereof.

Next, the depolymerized product is reacted with a polybasic acid, and the reaction product is polycondensed with a polyhydric alcohol to obtain a polyester-amide polymer containing 2 or 3 carboxyl groups at chain ends thereof and having an acid value of 1 to 150 mgKOH/g.

Specific examples of the polybasic acid that can be used in the recycling method in accordance with the second embodiment of the present invention include, but are not limited to, anhydrous phthalic acid, isophthalic acid, terephthalic acid, adipic acid, azelaic acid, sebacic acid, anhydrous tetrahydrophthalic acid, anhydrous maleic acid, fumaric acid, itaconic acid, trimellitic acid, anhydrous trimellitic acid, anhydrous pyromellitic acid, succinic acid, cyclohexane dicarboxylic acid, naphthalene dicarboxylic acid, dimeric acid, C6-C25 fatty acid and any combination thereof.

Preferably, the polybasic acid is used in an amount of 1 to 50% by weight, based on the weight of the depolymerization product obtained in the previous step. If the amount of the polybasic acid to be used is less than 1% by weight, this may lead to production of a high melting point polymer, thereby presenting poor modification problems. In contrast, if the amount of the polybasic acid exceeds 50% by weight, this may lead to consumption of a great deal of polyhydric alcohol which is thus disadvantageous from an economic point of view.

Next, the polyester-amide polymer is reacted with a basic compound to obtain a neutralized salt of the polyester-amide polymer having increased solubility in water or hydrophilic organic solvents.

Specific examples of the basic compound that can be used in the recycling method in accordance with the second embodiment of the present invention include, but are not limited to, sodium hydroxide, potassium hydroxide, ammonium hydroxide, lithium hydroxide, organic amines and any combination thereof. The amount of the basic compound to be used is preferably in the range of 1 to 30% by weight, based on the weight of the polyester-amide polymer. If the amount of the basic compound is less than 1% by weight, this may raise problems such as insufficient solubility in water or mixed solvents of the hydrophilic organic solvent and water. In contrast, if the amount of the basic compound is greater than 30% by weight, this may lead to problems associated with poor adhesiveness, poor chemical properties, and poor electrical properties.

Next, the neutralized salt of the polyester-amide polymer is dispersed in water, the hydrophilic solvent, or the mixed solvent thereof, to obtain the mixed waste in the form of water-soluble and water-dispersible polyester-amide solutions as final products. Specific examples of the hydrophilic solvent that can be used in the recycling method in accordance with the second embodiment of the present invention include, but are not limited to, alcohols, acetone, diacetone alcohol, dimethyl formamide, dimethyl acetamide, ethyl cellosolve, propyl cellosolve, butyl cellosolve, tetrahydrofuran, N-methyl-2-pyrollidone and any combination thereof.

Preferably, the hydrophilic solvent is used in an amount of 1 to 100% by weight, based on the weight of the neutralized salt of the polyester-amide polymer. Use of less than 1% by weight of the hydrophilic solvent results in poor solubility. In contrast, where the amount of the hydrophilic solvent exceeds 100% by weight, it is disadvantageous from environmental and economic points of view. In addition, the product, obtained by depolymerizing the mixed waste using the second embodiment of the present invention, is reacted with the polybasic acid and polyhydric alcohol to prepare a polyesteramide polyol having an acid value of 1 to 10 mgKOH/g and hydroxyl value of 5-200 mgKoH/g which is then reacted with diisocyanate to obtain a polyurethane resin. In addition, an ethylenic vinyl monomer containing a polymerization inhibitor may be dissolved in the polyester-amide block polymer to obtain a crosslinking curable unsaturated polyester amide resin.

Hereinafter, the recycling method of a mixed waste in accordance with the third embodiment of the present invention will be illustrated.

Firstly, in the same manner as in the recycling method of the mixed waste in accordance with the second embodiment, the mixed waste is reacted with a polyhydric alcohol to obtain a polyester-amide depolymerization product.

Then, the polyester-amide depolymerization product is reacted with a depolymerization-stabilizing solid resin to obtain a polyester-amide depolymerization product stabilized via the transesterification reaction. The depolymerization-stabilizing solid resin has properties to control the degree of polymerization and thus can stabilize the polyester-amide depolymerization product against reversible reaction. Specific examples of the depolymerization-stabilizing solid resin that can be used in the third embodiment of the present invention include, but are not limited to, gum rosin, wood rosin, tall rosin, hydrogenated rosin, maleated rosin, rosin ester, pinene resin, dipentene resin, C5 petroleum resin, C9 petroleum resin, dammar resin, copal resin, DCPD resin, hydrogenated DCPD resin, maleated styrene resin and any combination thereof. The depolymerization-stabilizing solid resin is preferably used in an amount of 1 to 100% by weight based on the weight of the depolymerization product. Where the amount of the stabilizing solid resin is less than 1% by weight, this may cause problems associated with control of intrinsic viscosity and the degree of polymerization. In contrast, where the amount of the stabilizing solid resin exceeds 100% by weight, this may incur problems associated with heat resistance and mechanical properties.

Next, the depolymerization product is polycondensed with a polybasic acid, dimethyl 5-sodium sulfoisophthalate (DMSSIP), or a mixture thereof. Herein, specific examples and amounts of the utilizable polybasic acid are the same as in the second embodiment.

DMSSIP is used to facilitate water-solubility or water-dispersibility. When the DMSSIP is used in admixture with the polybasic acid, the DMSSIP is preferably mixed in an amount of 1 to 30% by weight, based on the weight of the polybasic acid. If the amount of DMSSIP is less than 1% by weight, no addition effects thereof are substantially obtained. If the amount of DMSSIP is greater than 30% by weight, this may lead to problems associated with water resistance, chemical properties, and electrical properties.

Subsequently, the polyhydric alcohol for adjusting the acid value is added to the resulting material to further progress polycondensation, thereby obtaining a polyester-amide polymer. Herein, specific examples of the polyhydric alcohol that can be used are the same as those used in the second embodiment.

Then, the polyester-amide polymer is dissolved in water, a hydrophilic organic solvent or a mixed solvent thereof to recover it in the form of an aqueous solution where the polymer is dissolved in water, in the form of an organic solution where the polymer is dissolved in a hydrophilic organic solvent, or in solid form. Herein, specific examples and amounts of the hydrophilic organic solvent that can be used are the same as those used in the recycling method in accordance with the second embodiment.

Hereinafter, the recycling method of a mixed waste in accordance with the fourth embodiment of the present invention will be illustrated.

Firstly, a polyester oligomer containing an alkali metal sulfonate residue of aromatic dicarboxylic acid including DMSSIP is prepared. This polyester oligomer may be prepared via conventional processes for preparing polyester, such as transesterification or direct esterification. In order to increase solubility of the resulting polyester-amide polymer in water or a mixed solvent of water and hydrophilic solvent, the alkali metal sulfonate of aromatic dicarboxylic acid including DMSSIP is mixed and used. Herein, the alkali metal sulfonate of aromatic dicarboxylic acid is preferably used in an amount of 1 to 30% by weight, based on the weight of the polybasic acid. Where the amount of the alkali metal sulfonate of aromatic dicarboxylic acid is less than 1% by weight, no additional effects thereof are substantially obtained. In contrast, where the amount of the alkali metal sulfonate of aromatic dicarboxylic acid is greater than 30% by weight, thermal and mechanical properties of the resulting polyester-amide polymer are disadvantageously insufficient for practical use.

Next, the polyester oligomer containing alkali metal sulfonate residue of aromatic dicarboxylic acid is reacted with the mixed waste to depolymerize the mixed waste. Where reaction is continued to further progress, it is possible to obtain a polyester-amide polymer exhibiting increased solubility in water or a mixed solvent of water and hydrophilic solvent via polycondensation following transesterification.

Finally, the polyester-amide block polymer is recovered in the form of an aqueous solution or hydrophilic organic solution where the polymer is dissolved in water, a hydrophilic solvent or a mixed solvent thereof. Herein, specific examples and amounts of the utilizable hydrophilic solvent are the same as those used in the recycling method in accordance with the second embodiment.

Of course, after completion of polycondensation, the polyester-amide polymer may be directly recovered in solid form.

Hereinafter, the recycling method of a mixed waste in accordance with the fifth embodiment of the present invention will be illustrated.

Firstly, oil and fat is transesterified with a polyhydric alcohol including glycerin to prepare monoglycerides of fatty acids and mono polyhydric alcoholides of fatty acids. The mixed waste is added to and reacted with the resulting material to obtain a depolymerized product. Then, a polybasic acid is added to the depolymerization product, thereby leading to polycondensation thereof, followed by addition of the polyhydric alcohol to control an acid value. Further progress of polycondensation is carried out to obtain an oil-modified alkyd resin containing a polyester-amide block polymer which is then dissolved in an organic solvent such as naphtha or xylene to prepare an organic solution of the oil-modified alkyd resin. Herein, specific examples of the polybasic acid and polyhydric alcohol that can be used are the same as in the second embodiment.

In order to control physical properties of the resulting polymers in the first through fifth embodiments of the present invention, a monomer and waste polyamide producing polyamide may be further added and reacted to produce a polyamide block in step (b). Preferably, 1 to 90% by weight of the monomer and waste polyamide is contained in the prepared polymer.

By using recycling methods of the mixed waste in accordance with the above-mentioned embodiments of the present invention, it is possible to obtain a polyester-amide resin containing 1 to 90% by weight of polyamide blocks in the molecular structure of the solid or liquid polymer. The thus-obtained polyester-amide block polymer has a flow beginning temperature (Tfb) of 10 to 110° C., a flow ending temperature (Tend) of 110 to 165° C. and a glass transition temperature of 10 to 85° C., as measured using a capillary extrusion rheometer under a given load. In addition, the thus-obtained polyester-amide resin has two or three carboxyl groups at chain ends thereof, thus giving rise to good reactivity and dispersibility. Therefore, the polyester-amide resin recycled in accordance with the present invention can be used as synthetic resin fine particles, microcapsules, adsorbents, polymerization toner binders for electron photography, fiber processing agents, sizing agents for paper-making and paper strength agents, wastewater treatment agents, cement admixtures, inkjet ink binders, epoxy resin curing agents and modifiers, water-dispersible epoxy resin curing agents and modifiers.

Hereinafter, there will be illustrated a process for preparing a toner for use in electrostatic development, utilizing the polyester-amide reproduced from the mixed waste in accordance with the present invention as a binder. That is, it is possible to prepare the toner for electrostatic development utilizing a composition in which a colorant, a charge control agent and a releasing agent are added to the polyester-amide resin reproduced in accordance with the present invention, via conventional polymerization processes or grinding methods.

The water-soluble polyester-amide block polymer composition of the present invention has good dispersibility, compatibility and solubility, and thus can form a shell on the surface of a core material selected from drugs, fragrance agents, metal powders and the like. Therefore, the polyester-amide block polymer composition of the present invention is mixed with the core material and the resulting mixture is suspended in water containing a suspension promoter, filtered, and washed with water to prepare synthetic resin fine particles having a particle diameter of 1 to 10 ▯. The thus-prepared particles can be employed as cosmetics, drug carriers or materials for electronics.

In addition, the water-soluble polyester-amide resin composition of the present invention exhibits excellent compatibility, solubility, dispersibility and adhesiveness, and thus can be used as synthetic fiber yarns, textile sizing agents and processing agents.

Further, the water-soluble polyester-amide composition of the present invention exhibits excellent reactivity, adhesiveness and cohesiveness with pulp cellulose, and thus can be used as sizing agents for use in paper making and paper strength agents.

Additionally, the water-soluble polyester-amide composition of the present invention exhibits excellent reactivity and cohesiveness with sludge in wastewater, and thus can be used as wastewater treatment agents.

Also, the water-soluble polyester-amide composition of the present invention exhibits high reactivity with epoxy resins due to amide groups contained therein, and excellent adhesiveness, plasticity and solubility and thus may be used as curing agents and modifying agents.

Upon utilizing the polyester-amide recycled from the mixed waste in accordance with the present invention, it is possible to prepare a powder coating composition using an epoxy resin as the curing agent. The polyester-amide reproduced via the recycling method of the present invention has two or three carboxyl groups at chain ends thereof, thus giving rise to good reactivity and dispersibility. In addition, even when a tiny amount of an anti-blocking agent is added, the polyester-amide recycled via the recycling method of the present invention has excellent storage stability. It is a low-softening point resin and thus is curable within a short period of time, for example, 10 minutes, at below 180° C. Therefore, upon utilizing the polyester-amide reproduced according to the method of the present invention as a heat-curable paint for metals, it is possible to lower the curing temperature of the film and thus it is possible to obtain a coated film having high glossiness, superior heat and chemical resistance.

Use of the polyester-amide reproduced from the mixed waste according to the present invention enables preparation of oil-modified alkyd varnish paints and printer inks.

The oil-modified alkyd varnish paints, obtained by reacting the polyester-amide obtained according to the present invention with a fatty acid and dry oil, have excellent solubility in an aliphatic hydrocarbon solvent or aromatic hydrocarbon solvent, and the coated film obtained using the same exhibits excellent and firm glossiness, water resistance and weatherability. In addition, gravure ink, prepared by adding the colorant and additives to the polyester-amide obtained according to the present invention, is highly soluble in a mixed solvent of a ketone and aromatic hydrocarbon and thus it is possible to obtain superior printed form having fast dryness, and excellent adhesiveness, abrasion resistance and fastness.

In addition, use of the polyester-amide recycled from the mixed waste according to the present invention enables preparation of an adhesive.

A hot melt adhesive utilizing the polyester-amide reproduced according to the present invention as a base resin has low softening point, low melt viscosity, excellent adhesiveness, water resistance, chemical resistance, accelerability and compatibility. Thereby, it is possible to obtain superior initial adhesiveness and strong adhesive force in various substrates including paper, board, hide and leather, textiles, wood, plastics and metals such as aluminum. In addition, a liquid adhesive, obtained by dissolving the polyester-amide reproduced according to the present invention, as a base resin, in an organic solvent, may also be usefully employed to adhere the above-mentioned substrates.

Mode for the Invention

EXAMPLES

Now, the recycling method of a mixed waste in accordance with the present invention will be described in more detail with reference to the following examples. These examples are provided only for illustrating the present invention and should not be construed as limiting the scope and spirit of the present invention.

Example 1

400 g of ground chips of mixed waste, 200 g of gum rosin and 0.3 g of DBTO were charged to a reactor equipped with a stirrer, a reflux condenser, a separator, a thermometer and a nitrogen inlet and were heated to a temperature of 250° C. while injecting nitrogen gas. After beginning to melt, the mixed waste was stirred and maintained at that temperature for 2 hours. When the contents began to clear, the contents were cooled to 150° C. and 120 g of anhydrous maleic acid was added thereto. When heat was no longer generated from ring opening reaction, the reactants were heated again and reacted at 235° C. for 3 hours. The resulting depolymerization product exhibited an acid value of 110 mgKOH/g.

200 mg of ethylene oxide adduct of bisphenol A was added thereto and the mixture was subjected to polycondensation while dehydrating at 250° C. for 5 hours. The reaction product was cooled when the acid value thereof reached 55 mgKOH/g. Then, 50 g of sodium hydroxide and 1500 g of distilled water were added to the reaction product and the mixture was stirred at 85° C. for 30 minutes to prepare an aqueous solution of a polyester-amide block polymer. The polyester-amide exhibited an acid value of 39 mgKOH/g, a weight average molecular weight of 11,500, a softening point of 75° C. and a pH of 8.1. Using the polyester-amide resin as a polymerization toner binder, a toner was prepared via a polymerization method as follows. As a result, it was possible to prepare a toner having good physical properties and fastness.

100 g of the aqueous polyester-amide block polymer solution, 3 g of carbon black (PRINTEX 150T, commercially available from Degussa AG), 0.1 g of a charge control agent (BONTRON S-34, commercially available from Orient Chemical Co., Ltd.) and 1 g of a release agent were mixed and dispersed. The resulting dispersion was introduced to a strongly acidic aqueous solution to produce particles which were then filtered, washed with water, and dried. 1 g of an external additive was mixed with 100 g of particles to prepare toner particles.

The toner particles were charged to a printer cartridge to perform a printing process. Upon printing images, images were distinctive and excellent fastness was obtained.

Example 2

An aqueous polyester-amide resin solution was prepared in the same manner as in example 1, except that 400 g of mixed waste chips, 200 g of hydrogenated rosin, 0.3 g of dibutyltin oxide (DBTO), 150 g of anhydrous trimellitic acid and 200 g of neopentyl glycol were charged to the reactor. The polyester-amide of the thus-obtained aqueous polyester-amide resin solution exhibited an acid value of 30 mgKOH/g, a weight average molecular weight of 11,000, a softening point of 91° C. and a pH of 8.5.

Using the water-soluble polyester-amide resin as a polymerization toner binder, a toner was prepared via a polymerization method as follows. As a result, it was possible to prepare a toner having good physical properties and fastness.

100 g of the aqueous polyester-amide resin solution, 3 g of cyanine blue, 0.1 g of a charge control agent (BONTRON S-34, commercially available from Orient Chemical Co., Ltd.) and 1 g of a release agent were mixed and dispersed. According to the same manner as in example 1, particles were produced, filtered, washed with water and dried. 1 g of an external additive was added to 100 g of particles thus obtained and mixed to prepare blue toner particles.

These toner particles were charged to a printer cartridge to perform a printing process. Upon printing images, images were distinctive and excellent fastness was obtained.

Example 3

400 g of mixed waste chips, 100 g of diethylene glycol and 0.3 g of DBTO were charged to a reactor and the mixture was heated to a temperature of 235° C. for 3 hours under a stream of nitrogen to carry out depolymerization. When the contents became clear, 150 g of fumaric acid and 50 g of waste nylon fiber were added thereto and the temperature was elevated to 220° C. for 6 hours to carry out polycondensation, thereby preparing the aqueous polyester-amide resin solution. As a neutralizing agent, 55 g of potassium hydroxide was utilized. The polyester-amide of the thus-obtained aqueous polyester-amide resin solution exhibited an acid value of 28 mgKOH/g, a weight average molecular weight of 11,500, a softening point of 100° C. and a pH of 7.9.

100 parts by weight of the resin solution was mixed with 10 parts by weight of a UV blocking agent and the mixture was dispersed well. The resulting dispersion was suspended in 500 parts by weight of water containing 2 parts by weight of a suspension promoter, thereby preparing particles. Then, the particles were filtered, washed with water and dried to prepare synthetic resin fine particles having a volume average diameter of 5 ☐ for use in cosmetics.

Example 4

An aqueous polyester-amide resin solution was prepared in the same manner as in example 3, except that 400 g of mixed waste chips, 100 g of ethylene glycol, 0.3 g of DBTO and 150 g of anhydrous trimellitic acid were employed.

Provided that, as a neutralizing agent, 55 g of potassium hydroxide was replaced with 50 g of ammonium hydroxide. The thus-obtained aqueous polyester-amide resin exhibited an acid value of 45 mgKOH/g, a weight average molecular weight of 12,500, a softening point of 105° C. and a pH of 7.7.

100 parts by weight of the resin solution, 5 parts by weight of a fragrance agent, 3 parts by weight of a UV blocking agent and 50 parts by weight of an acrylic emulsion were mixed together. The resulting mixture was suspended in strongly acidic water to obtain microcapsules. The thus-obtained microcapsules were filtered, washed with water and dried to prepare microcapsules in which the fragrance agent and UV blocking agent were well protected within the core materials.

Example 5

An aqueous polyester-amide resin solution was prepared in the same manner as in example 3, except that 400 g of mixed waste chips, 100 g of propylene glycol, 0.3 g of DBTO, 50 g of adipic acid and 100 g of anhydrous maleic acid were employed.

Provided that, as neutralizing agents, 30 g of sodium hydroxide and 35 of triethylamine were used. The thus-obtained aqueous polyester-amide resin exhibited an acid value of 50 mgKOH/g, a weight average molecular weight of 11,700 and a pH of 7.5.

100 g of the resin solution, 50 parts by weight of an acrylic emulsion, 200 g of conductive powder and 3 g of release agent were mixed together. The resulting mixture was suspended in strongly acidic water to obtain conductive particles. These particles were filtered, washed with water and dried to prepare an material for electronics having excellent dispersibility and electrical conductivity.

Example 6

400 g of mixed waste chips, 100 g of ethylene glycol, 100 g of hydrogenated rosin, 0.3 g of DBTO, 100 g of DMSSIP, 150 g of anhydrous trimellitic acid and 80 g of trimethylolpropane were charged to a reactor and then the same procedure was carried out as in example 3. A neutralizing agent was replaced with 50 g of ammonium hydroxide. The thus-obtained water-soluble polyester-amide resin exhibited an acid value of 30 mgKOH/g, a weight average molecular weight of 12,500 and a pH of 7.1.

100 parts by weight of the resin solution, 5 parts by weight of a softening agent and 1 part by weight of silicon were mixed and 200 parts by weight of distilled water was added thereto. Polyester yarns and textiles were dipped in the resulting solution and dried. As a result, excellent adhesiveness and sizing effects were confirmed.

Example 7

A polyester-amide block polymer was prepared in the same manner as in example 3, except that 350 g of mixed waste chips, 100 g of neopentyl glycol, 250 g of maleated gum rosin, 0.3 g of DBTO and 100 g of adipic acid were employed. Then, 150 g of triethylenetetramine was added to render the mixture water-soluble, thereby preparing an aqueous solution of the polyester-amide.

The polyester-amide of the thus-obtained aqueous polyester-amide block polymer solution exhibited an acid value of 45 mgKOH/g, a weight average molecular weight of 11,200, a softening point of 79° C. and a pH of 8.5.

100 parts by weight of the resin solution, 2 g of oxidized starch and 200 parts by weight of distilled water were mixed together to prepare a sizing agent for use in paper-making and a paper strength agent. Paper was made and dried using a pilot paper making machine. As a result, excellent sizing effects and paper quality were confirmed.

Example 8

An aqueous solution of a polyester-amide resin was prepared in the same manner as in example 3, except that 350 g of mixed waste chips, 100 g of neopentyl glycol, 250 g of dicyclopentadiene resin, 0.3 g of DBTO and 150 g of anhydrous maleic acid were employed.

Provided 30 g of ammonium hydroxide and 500 of triethylamine were used as neutralizing agents. The polyester-amide of the thus-obtained aqueous polyester-amide resin solution exhibited an acid value of 80 mgKOH/g, a weight average molecular weight of 11,900, a softening point of 90° C. and a pH of 7.9.

10 parts by weight of the resin solution was diluted in 200 parts by weight of distilled water and the diluted solution was placed in 1,000 parts by weight of wastewater discharged from a car wash, followed by vigorous stirring and standing. As a result, sludge was precipitated while forming flock, and the supernatant became as clear as tap water.

Example 9

350 g of mixed waste chips, 100 g of diethylene glycol, 0.3 g of DBTO, 100 g of a dimeric acid and 100 g of an adipic acid were charged to a reactor and then the same procedure was carried out as in example 3. Then, 100 g of isopropyl alcohol and 100 g of triethylenetetramine were added thereto, thereby preparing a water-soluble polyester-amide block polymer.

The thus-obtained water-soluble polyester-amide resin exhibited an acid value of 70 mgKOH/g, a weight average molecular weight of 11,000 and a pH of 7.1.

100 parts by weight of the resin solution, 300 parts by weight of a water-dispersible epoxy resin (KEM-134-60, commercially available from KUKDO CHEMICAL CO., LTD., Korea), 10 parts by weight of a curing accelerator and 1 part by weight of silicon oil were mixed and stirred to prepare varnish which was then applied to a glass specimen to form a coated film. As a result, a strongly and firmly coated film having good adhesiveness and high gloss was formed.

Example 10

A polyester-amide block polymer was prepared in the same manner as in example 3, except that 400 g of mixed waste chips, 70 g of neopentyl glycol, 200 g of dicyclopentadiene resin, 0.3 g of DBTO, 100 g of isophthalic acid and 120 g of ethylene oxide adduct of bisphenol A were employed.

Provided that steps of neutralizing and rendering water-soluble were omitted and the polyester-amide block polymer was recovered in solid form. The solid polyester-amide resin exhibited an acid value of 7 mgKOH/g, a weight average molecular weight of 19,000 and a softening point of 120° C.

100 parts by weight of the solid resin, 7 parts by weight of cyanine blue, 1 part by weight of charge control agent and 3 parts by weight of a release agent were mixed and charged to a kneader. The mixture was heated to a temperature of 150° C., kneaded, coarsely milled and finely milled with a jet mill. The resulting materials were graded to prepare a blue toner having a particle diameter of 8 □ for electronic photography, which was then placed into a cartridge. The cartridge was mounted onto a laser printer (4300i, Samsung Electronics, Co., Ltd., Korea) and a printing process was carried out. As a result, images of blue printed materials were distinctive.

Example 11

A polyester-amide block polymer was prepared in the same manner as in example 3, except that 500 g of mixed waste chips, 100 g of diethylene glycol, 0.3 g of DBTO, 100 g of anhydrous maleic acid, 100 g of waste nylon molded article and 100 g of pentaerythritol were employed.

Provided that steps of neutralizing and rendering water-soluble were omitted and the polyester-amide block polymer was recovered in solid form. The solid polyester-amide block polymer exhibited an acid value of 5 mgKOH/g, a weight average molecular weight of 27,000 and a softening point of 140° C.

100 parts by weight of the solid resin, 5 parts by weight of carbon FW-200, 50 parts by weight of an epoxy resin, 1 part by weight of a curing accelerator, 1 part by weight of a flow control agent and 2 parts by weight of wax were mixed and charged to a kneader. The mixture was heated to a temperature of 150° C., kneaded, cooled, coarsely milled and finely milled. The resulting milled materials were graded to prepare a powder coating material having a particle diameter of 50 □. This coating material was electrostatically coated on a galvanized steel specimen which was then heat cured in a laboratory oven at a temperature of 180° C. for 30 min. As a result, a coated specimen having excellent adhesiveness, flex resistance and gloss was obtained.

Example 12

500 g of mixed waste chips, 500 g of fatty acid monoglyceride and 0.3 g of DBTO were charged to a reactor and heated to 230° C. for 3 hours under a stream of nitrogen to depolymerize the mixed waste. 100 g of gum rosin was added at the point when the contents became clear, and when the contents became low viscosity and clear, 100 g of anhydrous phthalic acid was added. Then, reactants were reacted at a temperature of 235° C. for 3 hours under reflux in a xylene solvent to prepare an oil modified alkyd resin. 1100 g of solvent naphtha was added to dilute the resulting alkyd resin and a drying agent was added to prepare alkyd resin varnish for paint. This varnish provided a coated film having high gloss, excellent water resistance and weatherability.

Example 13

500 g of mixed waste chips, 200 g of trimethylolpropane and 0.5 g of DBTO were charged to a reactor and heated to 235° C. under a stream of nitrogen. 150 g of PTMEG and 100 g of adipic acid were then added thereto. Reactants were reacted at 220° C. for 3 hours, cooled below 95° C. and 100 g of ethyl acetate was added. Below 50° C., 0.5 g of DBTDL was added, and 200 g of tolylene diisocyanate (TIE) was added dropwise over 2 hours while maintaining at 50° C. Thereafter, the temperature was elevated to 95° C. and reaction was further progressed for 3 hours. After cooling, 200 g of ethyl acetate was added to dilute the resulting material to obtain an organic solution of polyurethane resin. 100 g of the organic solution of polyurethane resin, 10 g of ethyl acetate and 2 g of a curing accelerator were mixed to prepare urethane adhesive which was then applied to both sides of synthetic fiber textile. As a result, an adhesive interface having excellent water resistance, adhesiveness and elasticity was obtained.

Example 14

400 g of mixed waste chips, 200 g of propyleneglycol and 0.5 g of DBTO were charged to a reactor and the mixture was heated and reacted at 230° C. for 3 hours under a stream of nitrogen. After decreasing the temperature to 160° C., 250 g of anhydrous maleic acid, 100 g of anhydrous phthalic acid and 150 g of propyleneglycol were added to carry out polycondensation for 7 hours while maintaining at 220° C. Then, 0.2 g of hydroquinone, as a polymerization inhibitor, was added thereto, and the reactants were cooled to obtain an unsaturated polyester resin.

100 g of the unsaturated polyester resin was dissolved in 50 g of a styrene monomer (containing 0.1 g of hydroquinone), and the resulting solution was mixed with 1 g of cobalt octate and 1 g of MEK peroxide to obtain a crosslinking curable unsaturated polyester-amide resin solution which was then applied to a glass fiber specimen to prepare an SMC molded article. The SMC molded article was wrapped with a polyethylene film and stored at room temperature for 48 hours. Then, the SMC molded article was thermoformed to obtain a glass fiber plate. Upon examining, the thus-obtained glass plate had no pin holes and exhibited uniform and firm gloss.

INDUSTRIAL APPLICABILITY

As apparent from the foregoing, a polyester-amide block polymer prepared according to a recycling method of a mixed waste of the present invention exhibits excellent compatibility and dispersibility with additives including a colorant and excellent adhesiveness to various substrates, and is also possible to be rendered water-soluble.

Therefore, an aqueous polyester-amide block polymer solution prepared from the mixed waste in accordance with the present invention can be utilized as industrially useful material such as synthetic resin fine particles, microcapsules, adsorbents, polymerization toner binders for electron photography, fiber processing agents, sizing agents for use in papermaking and paper strength agents, wastewater treatment agents, dispersants, cement admixtures, inkjet ink binders, epoxy resin curing agents and modifiers, water-dispersible epoxy resin curing agents and modifiers. The polyester-amide block polymer in solid form or in the form of an organic solution can be employed as industrially useful material such as binders for toner manufactured by grinding methods, printer inks, coating materials, powder paints, adhesives, hot melt adhesives, waterproof agents, crosslinking curable unsaturated polyester-amide resins, and polyurethane resins.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A recycling method of a mixed waste of polyester and polyamide, comprising:
   (a) depolymerizing the mixed waste of polyester and polyamide;
   (b) polycondensing the depolymerized product with a polyhydric alcohol to obtain a polyester-amide block polymer having an acid value of 1 to 150 mgKOH/g; and
   (c) recovering the polyester-amide block polymer in a solid or solution state where the acid value is greater than 20 mgKOH/g, or recovering the polyester-amide block polymer in a solid state where the acid value is less than 20 mgKOH/g,
   wherein in the step (b) a polyamide-producing monomer or waste polyamide is additionally added and reacted to produce a polyamide block, wherein the polyamide-producing monomer or waste polyamide is added in content of 1 to 90% by weight to the obtained polymer, wherein the polyamide-producing monomer is at least one selected from the group consisting of lactams containing more than 6 carbon atoms, aliphatic amino carboxylic acids, and polycondensation products of diacid and diamine, and wherein the waste polyamide is 6-nylon, 6,6-nylon, 11-nylon, or 12-nylon.

2. The method according to claim 1, wherein step (a) includes (a-1) reacting the mixed waste of polyester and polyamide with a solid resin dissolving agent to carry out first depolymerization; and (a-2) reacting the depolymerized product with a polybasic acid to carry out a second depolymerization and addition reaction (Diels-Alder Reaction).

3. The method according claim 2, wherein the solid resin dissolving agent is at least one selected from the group consisting of gum rosin, wood rosin, tall rosin, hydrogenated rosin, maleated rosin, rosin ester, pinene resin, dipentene resin, C5 petroleum resin, C9 petroleum resin, dammar resin, copal resin, DCPD resin, hydrogenated DCPD resin and maleated styrene resin.

4. The method according claim 2, wherein the mixing ratio of the solid resin dissolving agent: mixed waste is in the range of 1:10 to 10:1, on the basis of weight ratio.

5. The method according claim 2, wherein the polybasic acid is at least one selected from the group consisting of anhydrous phthalic acid, isophthalic acid, terephthalic acid, adipic acid, azelaic acid, sebacic acid, anhydrous tetrahydrophthalic acid, anhydrous maleic acid, fumaric acid, itaconic acid, trimellitic acid, anhydrous trimellitic acid, anhydrous pyromellitic acid, succinic acid, cyclohexane dicarboxylic acid, naphthalene dicarboxylic acid, dimeric acid and C6-C25 fatty acid.

6. The method according claim 2, wherein the polybasic acid is used in an amount of 1 to 70% by weight, based on the weight of the first depolymerization product.

7. The method according claim 1, wherein steps (a) and (b) are carried out in the presence of 0.05 to 0.5% by weight of a reaction catalyst, based on the total weight of reactants.

8. The method according to claim 1, wherein steps (a) and (b) are carried out in the range of 200 to 250 C.

9. The method according to claim 1, wherein the polyhydric alcohol in step (b) is at least one selected from the group consisting of ethylene glycol, propylene glycol, 1,3-propanediol, 1,4-butanediol, 1,6-hexanediol, neopentyl glycol, diethylene glycol, dipropylene glycol, polyethylene glycol, alkylene oxide adduct of bisphenol A, trimethylol propane, glycerin, pentaerythritol, fatty acid mono-glyceride, and mono polyhydric alcoholide of fatty acid.

10. The method according to claim 1, wherein the polyhydric alcohol in step (b) is used in an amount of 1 to 70% by weight, based on the weight of the de-polymerized product in step (a).

11. The method according to claim 1, wherein the polyester-amide block polymer prepared in step (b) has a weight average molecular weight of 3,000 to 50,000.

12. The method according to claim 1, wherein the polyester-amide block polymer prepared in step (b) has a softening point of 10 to 150 C.

13. The method according to claim 1, wherein the polyester-amide block polymer solution in step (c) is obtained by a method comprising (c-1) reacting the polyester-amide polymer of step (b) with a basic compound to obtain a neutralized polyester-amide block polymer; and (c-2) dissolving the neutralized polyester-amide block polymer in water, a hydrophilic solvent or a mixture thereof.

14. The method according to claim 13, wherein the basic compound is at least one selected from the group consisting of sodium hydroxide, potassium hydroxide, ammonium hydroxide, lithium hydroxide and organic amines.

15. The method according to claim 13, wherein the basic compound is used in an amount of 1 to 30% by weight, based on the weight of the polyester-amide block polymer.

16. The method according to claim 13, wherein the hydrophilic solvent is at least one selected from the group consisting of alcohols, ethers, acetone, diacetone alcohol, dimethyl formamide, dimethyl acetamide, tetrahydrofuran, ethyl cellosolve, propyl cellosolve, butyl cellosolve and N-methyl-2-pyrollidone.

17. The method according to claim 13, wherein water, the hydrophilic solvent or a mixed solvent thereof is used in 1 to 10-times amount based on the weight of the neutralized polyester-amide block polymer.

18. A recycling method of a mixed waste of polyester and polyamide, comprising:
   (a) reacting the mixed waste of polyester and polyamide with a polyhydric alcohol to obtain a polyester-amide depolymerization product;
   (b) reacting the depolymerized product with a polybasic acid, and poly-condensing the reaction product with the polyhydric alcohol to obtain a polyester-amide block polymer containing 2 or 3 carboxyl groups at chain ends thereof and having an acid value of 1 to 150 mgKOH/g; and
   (c) reacting the polyester-amide block polymer with a basic compound to obtain a polyester-amide block polymer in the form of a neutralized salt, followed by dispersing in water, a hydrophilic solvent or a mixed solvent thereof to obtain a water-soluble and water-dispersible polyester solution,
   wherein In the step (b) a polyamide-producing monomer or waste polyamide is additionally added and reacted to produce a polyamide block, wherein the polyamide-producing monomer or waste polyamide is added in content of 1 to 90% by weight to the obtained polymer, wherein the polyamide-producing monomer is at least one selected from the group consisting of lactams containing more than 6 carbon atoms, aliphatic amino carboxylic acids, and polycondensation products of diacid and diamine, and wherein the waste polyamide is 6-nylon, 6,6-nylon, 11-nylon, or 12-nylon.

19. The method according to claim 18, wherein the basic compound is at least one selected from the group consisting of sodium hydroxide, potassium hydroxide, ammonium hydroxide, lithium hydroxide and organic amines.

20. The method according to claim 18, wherein the basic compound is used in an amount of 1 to 30% by weight, based on the weight of the polyester-amide block polymer in step (b).

21. A recycling method of a mixed waste of polyester and polyamide, comprising:
   (a) reacting the mixed waste of polyester and polyamide with a polyhydric alcohol to depolymerize the mixed waste, and stabilizing the resulting product with a depolymerization-stabilizing solid resin to obtain a stabilized polyester de-polymerization product;
   (b) polycondensing the depolymerized product with a polybasic acid, dimethyl 5-sodium sulfoisophthalate (DMSSIP) or a mixture thereof, and adding an acid value-adjusting polyhydric alcohol to the resulting reaction product to obtain a polyester-amide block polymer; and
   (c) recovering the polyester-amide block polymer in the form of an aqueous solution where the polymer is dissolved in water, in the form of an organic solution where the polymer is dissolved in a hydrophilic organic solvent, or in solid form,
   wherein In the step (b) a polyamide-producing monomer or waste polyamide is additionally added and reacted to produce a polyamide block, wherein the polyamide-producing monomer or waste polyamide is added in content of 1 to 90% by weight to the obtained polymer, wherein the polyamide-producing monomer is at least one selected from the group consisting of lactams containing more than 6 carbon atoms, aliphatic amino carboxylic acids, and polycondensation products of diacid and diamine, and wherein the waste polyamide is 6-nylon, 6,6-nylon, 11-nylon, or 12-nylon.

22. The method according to claim 21, wherein the depolymerization-stabilizing solid resin is at least one selected from the group consisting of gum rosin, wood rosin, tall rosin, hydrogenated rosin, maleated rosin, rosin ester, pinene resin, dipentene resin, C5 petroleum resin, C9 petroleum resin, dammar resin, copal resin, DCPD resin, hydrogenated DCPD resin and maleated styrene resin.

23. The method according to claim 21, wherein the depolymerization-stabilizing solid resin is used in an amount of 1 to 100% by weight, based on the weight of the depolymerization product.

24. The method according to claim 21, wherein the polyhydric alcohol is at least one selected from the group consisting of ethylene glycol, propylene glycol, 1,3-propanediol, 1,4-butanediol, 1,6-hexanediol, neopentyl glycol, diethylene glycol, dipropylene glycol, polyethylene glycol, alkylene oxide adduct of bisphenol A, trimethylol propane, glycerin, pentaerythritol, fatty acid mono-glyceride, and mono polyhydric alcoholide of fatty acid.

25. The method according to claim 21, wherein the polybasic acid is at least one selected from the group consisting of anhydrous phthalic acid, isophthalic acid, terephthalic acid, adipic acid, azelaic acid, sebacic acid, anhydrous tetrahydrophthalic acid, anhydrous maleic acid, fumaric acid, itaconic acid, trimellitic acid, anhydrous trimellitic acid, anhydrous pyromellitic acid, succinic acid, cyclohexane dicarboxylic acid, naphthalene dicarboxylic acid, dimeric acid and C6-C25 fatty acids.

26. The method according to claim 21, wherein the polybasic acid is used in an amount of 1 to 50% by weight, based on the weight of the depolymerization product in step (a).

* * * * *